United States Patent
Grieve

[15] 3,644,234
[45] Feb. 22, 1972

[54] METHOD OF PREPARING CELLULAR POLYMERS FROM ORGANIC POLYISOCYANATES AND POLYCARBOXYLIC ACID COMPOUNDS

[72] Inventor: Robin L. Grieve, North Guilford, Conn.
[73] Assignee: The Upjohn Company, Kalamazoo, Mich.
[22] Filed: Jan. 27, 1969
[21] Appl. No.: 794,367

[52] U.S. Cl. ............................260/2.5, 260/47, 260/77.5
[51] Int. Cl. ...............................................C08q 22/44
[58] Field of Search............260/2.5 AC, 2.5 AM, 2.5 AW

[56] References Cited

UNITED STATES PATENTS

| | | | |
|---|---|---|---|
| 2,979,485 | 4/1961 | Burkus | 260/75 |
| 3,211,703 | 10/1965 | Gilman et al. | 260/77.5 |
| 3,214,392 | 10/1965 | Worsley | 260/2.5 |
| 3,300,420 | 1/1967 | Frey | 260/2.5 |

FOREIGN PATENTS OR APPLICATIONS

| | | | |
|---|---|---|---|
| 1,478,759 | 3/1967 | France | 260/2.5 |
| 1,511,865 | 12/1967 | France | 260/2.5 |

*Primary Examiner*—Donald E. Czaja
*Assistant Examiner*—M. J. Welsh
*Attorney*—John Kekich and Denis A. Firth

[57] ABSTRACT

High-temperature resistant cellular polymers are prepared in a one-shot procedure by reacting a polycarboxylic acid or polycarboxylic anhydride with an organic polyisocyanate in the presence of a catalytic amount of a monomeric homocyclic polyepoxide and a tertiary amine. The use of the latter catalyst system permits foam formation to proceed without the need to supply external heat to the reaction mixture after the reactants are brought together. This permits pouring in place of the foam-forming system, for example, in the insulation of cavity walls for construction purposes, in trailer walls, and in cold storage frameworks and the like.

13 Claims, No Drawings

METHOD OF PREPARING CELLULAR POLYMERS FROM ORGANIC POLYISOCYANATES AND POLYCARBOXYLIC ACID COMPOUNDS

BACKGROUND OF THE INVENTION

1. Field of the Invention

This invention relates to an improved process for the preparation of high temperature resistant cellular foams and is more particularly concerned with a novel catalytic process for the preparation of high temperature resistant cellular polymers from organic polyisocyanates and polycarboxylic acid derivatives and with the foams so produced.

2. Description of the Prior Art

Methods of preparing cellular polymers from organic polyisocyanates and polycarboxylic acid anhydrides have been described heretofore; see U.S. Pat. No. 3,300,420. In the latter method it has been necessary to bring the components together in the fluid state and to heat the resulting mixture of reactants to a temperature of at least 230° C. in order to initiate the formation of the cellular polymer foam.

In a related known method of making a cellular polymer which is a composite of a polyurethane and a polyimide foam, a polycarboxylic acid or anhydride is incorporated into a conventional polyurethane foam-producing system, see French Pat. Nos. 1,461,270 and Certificate of Addition 90,033 thereto. In this system the reaction of the polyisocyanate with the polycarboxylic acid derivative and with the polyol employed in the conventional polyurethane foam system proceeds simultaneously. However, it is necessary to subject the resulting mixed polymer foam to high-temperature conversion in order to produce a final product having thermal properties approaching those of polyimide foams prepared as described by the above method.

A third alternative method of preparing high-temperature polyimide foams is described, for example, in U.S. Pat. No. 3,310,506, which involves the reaction of a polyisocyanate and a polycarboxylic acid anhydride to form an intermediate polyamide acid under foam-producing conditions. The cellular polyamide acid so produced is then heated to complete ring closure with formation of the corresponding polyimide foam. The temperatures required to effect this conversion are those of the same order as employed above in the direct reaction of polyisocyanate and polycarboxylic acid anhydride to form the polyimide foam.

All the above methods of producing polyimide foams possess the serious drawback that they cannot be used to prepare poured-in-place foams. Such foams are those which are prepared by placing the foam-forming reactants within a cavity, such as that within the hollow walls of a trailer truck which is to be insulated with the foam, or within the walls of a cold storage warehouse and the like. The necessity to expose either the reaction mixture or the end product to high temperatures in order to produce the foams in accordance with the above-described methods renders such methods useless for pour-in-place applications.

I have now found that the reaction between a polyisocyanate and a polycarboxylic acid derivative can be conducted readily under conditions which do not require any external heat to be supplied to the foam reaction components, after they are brought together, or to the end product of the foam reaction after it has been formed. The advantages of being able to effect such an operation in this manner will be obvious to one skilled in the art. The process of the present invention enables, for the first time, polyimide foams to be prepared and employed on a large scale with all the convenience which is enjoyed in the manufacture and use of conventional polyurethane foams.

BRIEF DESCRIPTION OF THE INVENTION

My invention in its broadest aspect comprises an improved process for the preparation of a high temperature resistant polymer foam by reaction of an organic polyisocyanate and a polycarboxylic acid derivative containing at least two carboxylic moieties selected from the class consisting of free carboxylic acid groups and anhydride groups, wherein the improvement comprises carrying out the reaction in a one-shot procedure in the presence of a catalytic amount of a mixture of a monomeric homocyclic polyepoxide and a tertiary amine.

DETAILED DESCRIPTION OF THE INVENTION

In carrying out the process of the invention, the polyisocyanate and the polycarboxylic derivative, each of which will be defined and exemplified hereinafter, are brought together in a one-shot procedure in the presence of a particular combination of catalysts, namely, a monomeric homocyclic polyepoxide, as hereinafter defined, and a tertiary amine. Using this procedure it is unnecessary to supply any external heat to the reaction mixture after the reactants have been brought together. It is generally found that a small amount of heat is necessary in order to initiate the reaction but this initiation temperature is so low that it can be attained readily by preheating the reaction components. Since the latter are, in many cases, low melting solids, the preheating thereof serves a double purpose by rendering the materials fluid and hence more easily dispensed in mechanical mixing machines normally employed for generation of foam reaction mixture. Advantageously, the reaction components, namely the polyisocyanate and the polycarboxylic acid derivative, are preheated to a temperature within the range of 35° to 100° C. and preferably are heated to a temperature within the range of about 50° C. to about 55° C.

When the components of the reaction mixture are preheated in the above manner, it is found unnecessary, using the novel catalyst combination described herein, to apply any further heat to the reaction mixture in order to initiate polymer foam formation. Once the preheated reactants are brought together in the presence of the particular catalyst system set forth above, polymer foam formation takes place spontaneously in an exothermic reaction. The resulting cellular polymers are characterized by high thermal resistance as will be discussed more particularly hereinafter.

In carrying out the process of the invention, no special techniques are required other than to bring the reaction components to a temperature within the above range prior to mixing. The various components are simply brought together using agitation means sufficient to ensure homogeneity in the resulting mixture. Advantageously, the polyisocyanate and polycarboxylic acid components are mixed together in a preliminary step and the catalyst combination is added to this premix with vigorous agitation. The mixing of the components can be carried out by hand when operation on a small scale but is advantageously carried out using the various mixing and dispensing machines conventionally employed in the manufacture of polymer foams; see, for example, Ferrigno "Rigid Plastic Foams," Reinhold Publishing Corporation, New York 1963. Immediately after completion of mixing of the components the foam reaction mix is poured or dispensed directly into the appropriate mold and foaming is allowed to take place in the mold in accordance with procedures well recognized in the art for the molding of polymer foams. The foam-producing reaction is highly exothermic, more so than is the case with most polymer foam-forming systems, such as polyurethane foam-forming systems hitherto encountered in the art. Accordingly, allowance is made for this high exothermicity in designing the molds employed with the polymer foams of the invention.

As set forth above, the monomeric polyepoxide and the tertiary amine are employed in catalytic amounts, i.e., the amount of each component is less than 1 mole per mole of the polyisocyanate and polycarboxylic acid derivatives. Advantageously, the amount of polyepoxide employed is from about 0.01 mole to about 0.2 mole per mole of polyisocyanate and preferably is from about 0.01 mole to about 0.1 mole per mole of polyisocyanate. Similarly, the proportion of tertiary amine employed in the catalyst system is advantageously from about 0.01 mole to about 0.2 mole per mole of polyisocyanate and preferably is from about 0.01 mole to about 0.1 mole per mole of isocyanate.

The proportion of tertiary amine to epoxide in the catalyst combination is not critical provided each of the components in the combination is present in a concentration, based on polyisocyanate, within the limits set forth above. Thus, we have found that the process of the invention cannot be carried out in the presence of polyepoxide alone, i.e., in the absence of tertiary amine. Similarly, we have found that the process of the invention cannot be carried out using tertiary amine alone in the absence of polyepoxide. In the case of a particular group of tertiary amine catalysts, namely the N,N′, N″-trialkylaminoalkyl-hexahydrotriazines as further described and exemplified hereafter, it is possible to promote some reaction between a polyisocyanate and a polycarboxylic acid derivative even in the absence of polyepoxide but the predominant reaction occuring under such circumstances is polymerization of the polyisocyanate with polyisocyanurate formation.

The proportion of polyisocyanate employed in the process of the invention is advantageously at least 0.025 equivalent per equivalent of polycarboxylic acid. The upper limit of the amount of polyisocyanate employed is not critical and is dictated largely by economic factors. A practical upper limit of polyisocyanate is of the order of about 10 equivalents of polyisocyanate per equivalent of polycarboxylic acid. Generally speaking, however, a proportion of about 0.6 to about 2.0 equivalents of polyisocyanate per equivalent of polycarboxylic acid derivative is preferred. Most preferably the proportion of polyisocyanate is of the order of 1 equivalent per equivalent of polycarboxylic acid derivative.

As will be appreciated by one skilled in the art, the product obtained, when the proportions of polyisocyanate and polycarboxylic acid derivative are equivalent, will be substantially exclusively a polyimide. When the amount of polycarboxylic acid derivative employed in the process of the invention is less than 1 equivalent per equivalent of polyisocyanate the product of reaction is a copolymer containing, in addition to recurring imide and/or amide moieties (see hereinafter), moieties corresponding to the polyisocyanurate obtained by trimerization of the excess polyisocyanate. There may also be present in the reaction product polyoxazolidinone moieties derived by reaction between the excess polyisocyanate with polyepoxide when a polyepoxide is employed in the catalyst system. The proportions of such moieties other than polyimide will obviously be greater, the greater the amount of polyisocyanate employed in excess of the stoichiometric proportion.

The term "equivalent" when employed in reference to the polycarboxylic acid derivative corresponds to the acid equivalent weight of the compound, i.e., the molecular weight divided by the number of carboxylic acid groups per molecule or in the case of a polycarboxylic acid intramolecular anhydride, the molecular weight of said anhydride divided by the number of anhydride moieties per molecule.

The polyisocyanate employed in the preparation of the novel cellular polymers of the invention can be any of the polyisocyanates, organic and inorganic, known to be useful in the art of polymer formation. Such polyisocyanates are commonly employed in the preparation of polyurethanes by reaction with compounds containing two or more active-hydrogen-containing groups (i.e., groups which show a positive reaction when tested by the Zerewitinoff method, Journal American Chemical Society 49, 3181, 1927).

Illustrative of such polyisocyanates are 2,4-tolylene diisocyanate, 2,6-tolylene diisocyanate, 4,4′-methylenebis(phenyl isocyanate), dianisidine diisocyanate, tolidine diisocyanate, hexamethylene diisocyanate, m-xylene diisocyanate, 1,5-naphthalene diisocyanate, p-phenylene diisocyanate, 1,4-diethylbenzene-$\beta,\beta'$-diisocyanate and other di- and higher polyisocyanates such as those listed in the tables of Siefken, Ann. 562, 122–135 (1949). Mixtures of two or more of the above isocyanates can be used, such as mixture of the 2,4- and 2,6-isomers of tolylene diisocyanate, mixtures of the 2,4′- and 4,4′-isomer of methylenebis(phenyl isocyanate) and the like. In addition to the 4,4′-methylenebis(phenyl isocyanate) or mixtures of the 2,4′-isomer and 4,4′-isomer thereof which are employed as the isocyanate component, there can also be used modified forms of these isocyanates. For example, there can be used 4,4′-methylenebis(phenyl isocyanate), or an admixture thereof with a minor amount of the 2,4′-isomer, which has been treated to convert a minor proportion, generally less than 15 percent by weight of the starting material, to an artefact of said starting material. For example, the polyisocyanate component can be methylenebis(phenyl isocyanate) which has been converted to a stable liquid at temperatures of about 15° C. and higher using, for example, the processes described in Belgian Pat. No. 678,773.

Illustrative of another modified form of 4,4′-methylenebis(phenyl isocyanate) which can form the polyisocyanate component is the product obtained by treating the former compound, or mixtures thereof with small portions of 2,4′-isomer, with a minor portion of a carbodiimide such as diphenylcarbodiimide in accordance, for example, with the procedure described in British Pat. No. 918,454. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above, there can also be employed as the polyisocyanate component a mixture of methylenebis(phenyl isocyanate) with polymethylene polyphenyl isocyanates of higher functionality. Such mixtures are generally those obtained by phosgenation of corresponding mixtures of methylene-bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art, see, for example, U.S. Pat. Nos. 2,683,730; 2,950,263; 3,012,008; and 3,097,191; Canadian Pat. No. 665,495; and German Pat. No. 1,131,877. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The polycarboxylic derivative employed in the process of the invention contains at least two carboxylic moieties selected from the class consisting of free carboxy groups and anhydride groups. Said polycarboxylic derivatives are inclusive of aromatic, aliphatic, cycloaliphatic or heterocyclic polycarboxylic acids as well as the intramolecular and/or intermolecular anhydrides thereof, provided that, in the case of those anhydrides which contain a single anhydride group there is also present in the molecule at least one free carboxy group. As will be appreciated by one skilled in the art, only those polycarboxylic acids which contain carboxy groups attached either to two adjacent carbon atoms or to two carbon atoms which are separated from each other by a single carbon or heteroatom are capable of forming *intra*- as opposed to *inter*-molecular acid anhydrides.

Any of the aforesaid polycarboxylic acids or anhydrides can be employed as the polycarboxylic derivative in the process of the invention. As will be apparent to the skilled chemist, the nature of the recurring units in the resulting polymers will vary according to the structure of the starting polycarboxylic derivative.

When the polycarboxylic acid derivative is a dicarboxylic acid which is incapable of forming an intramolecular anhydride, the product formed in accordance with the process of the invention is essentially a polyamine, e.g., the product from said dicarboxylic acid and a diisocyanate would contain the recurring unit:

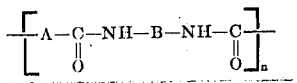

wherein A is the hydrocarbon residue of the dicarboxylic acid starting material and B is the hydrocarbon residue of the diisocyanate. On the other hand, when the polycarboxylic derivative is an intramolecular or intermolecular anhydride which contains two or more anhydride moieties or contains one anhydride moiety and free carboxylic acid groups capable of intramolecular or intermolecular anhydride formation, the product of reaction in accordance with the process of the invention is essentially a polyimide, e.g., the product of reaction of a diisocyanate and a polycarboxylic acid derivative containing two intramolecular anhydride groups would contain the recurring unit:

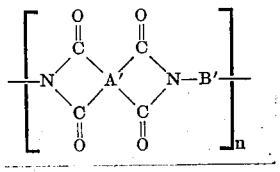

wherein A' is the hydrocarbon residue of the dianhydride and B' is the hydrocarbon residue of the diisocyanate.

Similarly where the polycarboxylic acid derivative contains one or more anhydride groups in addition to a free carboxylic acid group or groups, the polymer resulting from the process of the invention will be essentially a hybrid containing both amide and imide linkages.

All of the above types of polymers can be prepared in accordance with the novel process hereinabove described and all fall within the scope of this invention. Thus, by appropriate choice of the polycarboxylic acid derivative it is possible to prepare any of a wide variety of polymers using the single-step process of the invention.

Examples of polycarboxylic derivatives which can be employed as the free carboxylic acids or as intermolecular anhydrides formed from the same or different acids are: isophthalic acid, terephthalic acid, trimesic acid and phthalic acid. Examples of polycarboxylic derivatives which can be employed as the free carboxylic acids or intramolecular anhydrides thereof, are:

trimellitic acid and the anhydride thereof,
pyromellitic acid and the dianhydride thereof,
mellophanic acid and the anhydride thereof,
benzene-1,2,3,4-tetracarboxylic acid and the dianhydride thereof,
benzene-1,2,3-tricarboxylic acid and the anhydride thereof,
diphenyl-3,3',4,4'-tetracarboxylic acid and the dianhydride thereof,
diphenyl-2,2',3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6,7-hexahydronaphthalene-1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl)methane and the dianhydride thereof,
bis(3,4-dicarboxyphenyl)methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl)propane and the dianhydride thereof,
2,3-bis(3,4-dicarboxyphenyl)propane and the dianhydride thereof,
bis(3,4-dicarboxyphenyl)sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4-tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof,
mellitic acid and the trianhydride thereof,
thiophen-2,3,4,5-tetracarboxylic acid and the dianhydride thereof,
and benzophenone-3,3',4,4'-tetracarboxylic acid and the dianhydride thereof.

Other anhydrides which may be employed in the practice of the invention are: the intermolecular anhydride of trimellitic acid 1,2-anhydride (see, for example U.S. Pat. No. 3,155,687), the bis-anhydrides disclosed in U.S. Pat. No. 3,277,117 (e.g., 4,4'-ethylene glycol bis-anhydro trimellitate and 4,4'-(2-acetyl-1,3-glycerol) bis-anhydro trimellitate) and the diadducts of maleic acid or anhydride with styrene.

While any of the polycarboxylic acids and intramolecular or intermolecular anhydrides thereof defined and exemplified above can be employed in the preparation of the polymers of the invention a preferred group of compounds for this purpose are intramolecular anhydrides which are derived from polycarboxylic acids having at least three carboxyl groups of which at least two carboxyl groups are attached directly to an aromatic nucleus in orthoposition with respect to each other. A particularly preferred group of polycarboxylic acid intramolecular anhydrides are those selected from the class consisting of anhydrides having the following formulas:

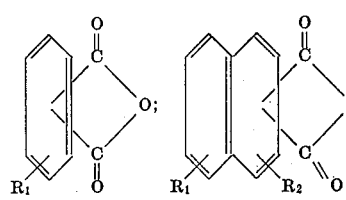

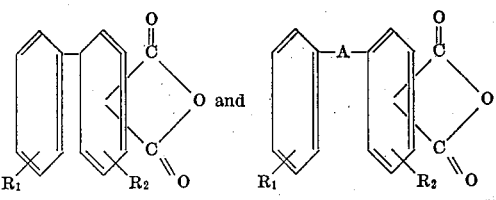

wherein at least one of $R_1$ and $R_2$ represents a group selected from the class consisting of carboxyl and the group

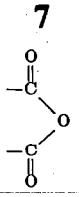

wherein the carbon atoms of the latter are each attached to adjacent carbon atoms in an aromatic ring, and wherein $R_1$ and $R_2$ additionally represent from zero to three substituents selected from the group consisting of halogen and lower-alkyl and A is a bridging group selected from the class consisting of lower-alkylene, carbonyl, sulfonyl and oxygen.

The term "lower-alkyl" means alkyl containing from one to six carbon atoms, inclusive, such as methyl, ethyl, propyl, butyl, pentyl, hexyl, and isomeric forms thereof. The term "halogen" means fluorine, chlorine, bromine, and iodine. The term "lower-alkylene" means alkylene containing from one to six carbon atoms, inclusive, such as methylene, ethylene, 1,3-propylene, 1,4-butylene, 2,3-butylene, 1,6-hexylene and the like.

The monomeric polyepoxide employed in the catalyst system in the preparation of the novel cellular polymers of the invention can be any monomeric compound containing two or more epoxide (

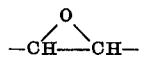

or oxirane) groups. The preferred polyepoxides used in preparing the cellular polymers of the invention are monomeric homocyclic polyepoxides.

Such epoxides are characterized by the presence of at least two epoxy groups each of which is present in a substituent attached to a cyclic hydrocarbon compound or is fused to a nonaromatic ring in a cyclic hydrocarbon compound. Examples of monomeric homocyclic polyepoxides are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

2. the glycidyl ethers of nonfused polynuclear phenols represented by the general formula:

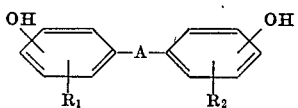

wherein $R_1$ represents from zero to four substituents selected from the class consisting of halogen and lower-alkyl, A is a bridging group selected from the class consisting of

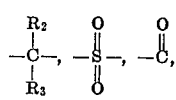

, —O—, —S— and a single covalent bond, wherein $R_2$ and $R_3$ each represent a moiety selected from the class consisting of hydrogen, lower-alkyl, lower-cycloalkyl and aryl. Illustrative of such compounds are the bis(glycidyl ethers) of:
 4,4'-dihydroxydiphenylsulfone,
 4,4'-dihydroxybiphenyl,
 4,4'-dihydroxybenzophenone,
 di(4-hydroxyphenyl)methane (bisphenol F),
 2,2-di(4-hydroxyphenyl)butane (bisphenol B),
 2,2-di(4-hydroxyphenyl)propoane (bisphenol A),
 1,1-di(4-hydroxyphenyl)propane,
 3,3-di(3-hydroxyphenyl)pentane,
 2-(3-hydroxyphenyl)-2-(4-hydroxyphenyl)butane,
 1-phenyl-1-(2-hydroxyphenyl)-1-(3-hydroxyphenyl)propane,
 1-phenyl-1,1-di(4-hydroxyphenyl)butane,
 1-phenyl-1,1-di(4-hydroxyphenyl)pentane,
 1-tolyl-1,1-di(4-hydroxyphenyl)ethane,
 bis(3-bromo-4-hydroxyphenyl)methane,
 2,2-bis(3-bromo-4-hydroxyphenyl)propane,
 bis(3-bromo-4-hydroxyphenyl)diphenylmethane,
 1,1-bis(3-bromo-4-hydroxyphenyl)-1-(2,5-dibromophenyl)ethane,
 2,2-bis(3-bromo-4-hydroxyphenyl)propionitrile,
 bis(3,5-dibromo-4-hydroxyphenyl)methane,
 2,2-bis(3,5-dibromo-4-hydroxyphenyl)propane,
 bis(3,5-dibromo-4-hydroxyphenyl)methane,
 1,1-bis(3,5-dibromo-4-hydroxyphenyl)-1-(2,5-dibromophenyl)ethane,
 bis(3-bromo-4-hydroxyphenyl)sulfone,
 bis(3,5-dibromo-4-hydroxyphenyl)sulfone, 3. the glycidyl ethers of novolac resins. The novolac resins are the products obtained by acid condensation of phenol, or a substituted phenol, with formaldehyde and are conventionally represented by the general formula:

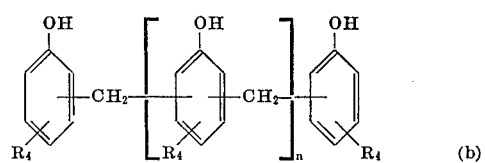

wherein $n$ has an average value of from about eight to 12 and $R_4$ represents from zero to four substituents selected from halogen and lower alkyl groups. It is to be understood that the above formula is highly idealized and is an approximation only; see, for example, Carswell, "Phenoplasts," pages 29–35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures, e.g., reaction with epichlorohydrin) will be referred to hereafter as "novolac resin glycidyl ethers";

4. dicyclopentadiene dioxide, i.e., the compound having the formula:

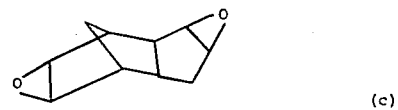

5. vinyl cyclohexene dioxide, i.e., the compound having the formula:

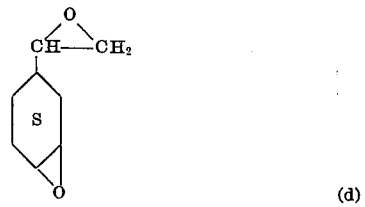

6. the dicyclohexyl oxide carboxylates represented by the general formula:

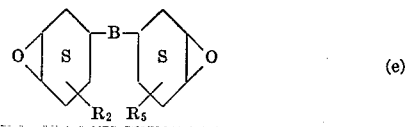

wherein $R_5$ in each instance represents from zero to nine lower-alkyl groups, and B represents a divalent radical selected from the class consisting of:

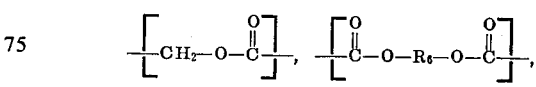

and

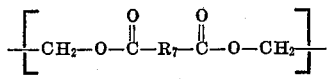

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexanecarboxylate, 3,4-epoxy-6-methylcyclohexylmethyl 3,4-epoxy-6-methylcyclohexylcarboxylate, bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclohexanecarboxylate and the like.

7. the glycidyl derivatives of aromatic primary amines represented by the formula:

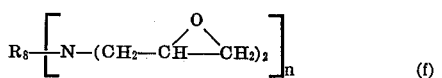

wherein $n$ is an integer from 1 to 3 and $R_8$ is an aromatic residue of valency $n$ selected from the class consisting of aromatic residues having the formulas:

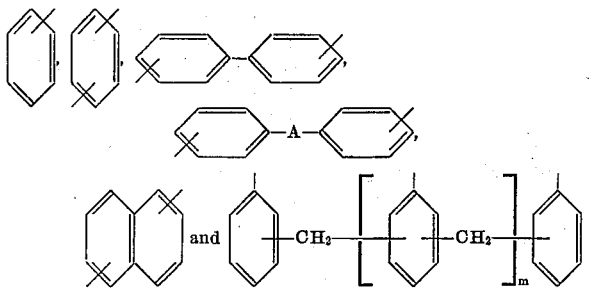

wherein A is a bridging group as hereinbefore defined and $m$ is a number having an average value of from about 0.1 to about 1.0. Illustrative of such compounds are the N,N-diglycidyl derivatives of:

aniline,
2,4-tolylene diamine,
2,6-tolylene diamine,
m-phenylene diamine,
p-phenylene diamine,
4,4'-diamino-diphenyl,
4,4'-diamino-diphenyl methane,
2,2-di(4-aminophenyl)propane,
2,2-di(4-aminophenyl)butane,
4,4'-diamino-diphenyl sulfide,
4,4'-diamino-diphenyl sulfone,
4,4'-diamino-diphenyl ether,
1,5-diamino-napthalene, and methylene-bridged polyphenyl polyamines from about 35 percent by weight to about 85 percent by weight of methylenedianilines, the remaining parts of said mixture being triamines and polyamines of higher molecular weight, said polyamine mixture having been formed by acid condensation of aniline and formaldehyde. The latter polyamine mixtures can be prepared by procedures well known in the art; see, for example, British Pat. Specification No. 1,042,220.

The term "lower-cycloalkyl" as used through this specification and the claims thereof means cycloalkyl from four to eight carbon atoms such as cyclobutyl, cyclopentyl, cyclohexyl, cycloheptyl, and cyclooctyl. The term "lower-oxyalkylene" means lower-alkylene, as defined above, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from six to 12 carbon atoms, inclusive. Illustrative of aryl moieties are phenyl, tolyl, xylyl, biphenylyl, naphthyl and the like.

The monomeric homocyclic polyepoxides described and exemplified hereinabove are, for the most part, well known in the art and can be prepared by methods well known in the art; see, for example, Lee and Neville, "Epoxy Resins," McGraw-Hill Book Company, New York (1957), U.S. Pat. Nos. 2,633,458; 2,716,123; 2,745,847; 2,745,285; 2,872,427; 2,884,408; 2,902,518; 2,921,037; 3,312,664; 3,268,619; 3,325,452; and British Pat. No. 614,235.

While any of the monomeric homocyclic polyepoxide compounds exemplified hereinabove can be used in the preparation of the high temperature resistant polymers of the invention, the preferred compounds for this purpose are those of the groups (2), (3), and (7) set forth above, namely, the glycidyl ethers of nonfused polynuclear phenols represented by the formula (a) above, the novolac resin glycidyl ethers represented by formula (b) above, and the glycidyl derivatives of primary aromatic amines represented by the formula (f) above. The use of epoxides of these classes gives rise to cellular polymers of the invention which possess the highest resistance to deformation by heat and the lowest flame spread rating of the cellular polymers of this class.

Within this particular group of polyepoxides we have found that those which are derived from phenols of the formula (b) above are the most preferred since they give rise to cellular polymers having the highest resistance to flame spread and heat deformation.

The tertiary amines which are employed in the catalyst system in accordance with the process of the invention are those which are more usually employed to catalyze the reaction between an isocyanato group and an active hydrogen atom. Such catalysts are a group of compounds well recognized in the art of synthesizing polyurethanes; see, for example, Saunders et al. Polyurethanes, Chemistry and Technology, Part I, pages 228–230, Interscience Publishers, New York, 1964, see also Burkus, J., Journal of Organic Chemistry, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo [2·2·2] octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N''-trialkylaminoalkylhexahydrotriazines such as N,N',N''-tris(dimethylaminomethyl)-hexahydrotriazine, N,N',N''-tris(dimethylaminoethyl)hexahydrotriazine, N,N',N''-tris(diethylaminopropyl)hexahydrotriazine, N,N',N''-tris(diethylaminoethyl)hexahydrotriazine, N,N',N''-tris(diethylaminopropyl)hexahydrotriazine and the like; mono-, di-, and tri-(dialkylaminoalkyl) monohydric phenols or thiophenols such as 2-(dimethylaminomethyl)phenol, 2-(dimethylaminobutyl)phenol, 2-(diethylaminoethyl)phenol, 2-(diethylaminobutyl)phenol, 2-(dimethylaminomethyl)thiophenol, 2-(diethylaminoethyl)thiophenol, 2,4-bis(dimethylaminoethyl)phenol, 2,4-bis(diethylaminobutyl)phenol, 2,4-bis(dipropylaminoethyl)phenol, 2,4-bis(dimethylaminoethyl)thiophenol, 2,4-bis(diethylaminopropyl)thiophenol, 2,4-bis(dipropylaminoethyl)thiophenol, 2,4,6-tris(dimethylaminoethyl)phenol, 2,4,6-tris(diethylaminoethyl)phenol, 2,4,6-tris(dimethylaminobutyl)phenol, 2,4,6-tris(dipropylaminomethyl)phenol, 2,4,6-tris(diethylaminoethyl)thiophenol, 2,4,6- tris(dimethylaminoethyl)thiophenol the like; N,N,N',N'-tetraalkylalkylenediamines such as N,N,N',N'-tetramethyl-1,3-propane diamine, N,N,N',N'-tetramethyl-1,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like.

The preferred tertiary amine catalysts for use in preparing the polymers of the invention are the triethylenediamines, the N,N',N''tris(dialkylaminoalkyl)hexahydrotriazines, the mono(dialkylaminoalkyl)phenols, and the 2,4,6-tris(dialkylaminoalkyl)phenols. These preferred tertiary amine catalysts can be employed singly or in combination of two or more such amines. A particularly preferred combination of tertiary amines to be used in conjunction with an epoxide in accordance with the invention, is a mixture of triethylene diamine and a 2,4,6-tris(dialkylaminoalkyl)phenol. The mixture is advantageously preblended and employed in liquid form thereby overcoming the usual difficulty of employing triethylenediamine which is a solid at ordinary temperatures.

The condensation of the polyisocyanate and the polycarboxylic acid derivative in accordance with the process of the invention results in the elimination of carbon dioxide. This evolved carbon dioxide behaves as an in situ foaming agent resulting in low-density, high temperature resistant cellular products. If lower density products are desired, other extraneously added foaming agents may be employed in the preparation of the cellular products of the invention.

Illustrative of said foaming agents are water (which generates carbon dioxide by reaction with isocyanate) and volatile solvents such as the lower molecular weight aliphatic hydrocarbons, namely those having boiling points of from about $-40°C.$ to about $200°C.$, preferably from about $-20°C.$ to about $115°C.$, for example, difluorochloromethane, trichloromonofluoromethane, dichlorodifluoromethane, chlorotrifluoromethane, 1,1-dichloro-1-fluoroethane, 1-chloro-1,1-difluoro-2,2-dichloroethane, and 1,1,1-tribromo-2-chloro-2-fluorobutane, and the like. If desired, a mixture of water and one or more of said volatile solvents can be used as a foaming agent.

If desired, a minor amount of a polyol can be incorporated into the reaction mixture employed in accordance with the invention. By minor amount is meant less than 50 percent by weight of the major component of the reaction mixture. Preferably the polyol is employed in an amount of from about 0.05 to about 0.2 equivalent per equivalent of polyisocyanate. While the inclusion of a polyol does not materially enhance or detract from the high temperature resistant properties of the final foam, it does appear to contribute materially to the ease with which the main reactants, i.e., polyisocyanate and polycarboxylic acid derivative, can be blended.

The polyols which are employed as optional additives in the compositions of the invention can be any of those commonly employed in the preparation of polyurethane foams; see, for example, U.S. Pat. Nos. 3,372,130 and 3,376,236. Such polyols can be polyether or polyester polyols having hydroxyl numbers from about 180 to about 800 and a functionality from two to eight.

Particularly useful polyols for employment in the process of the invention are those polyols containing phosphorous and/or chlorine and bromine such as: the polyester polyols based on chlorendic acid, tetrabromo phthalic acid and tetrachloro phthalic acid or the corresponding anhydrides thereof; see, for example, U.S. Pat. Nos. 2,865,869, 3,018,256, 3,058,925, 3,098,047, and 3,214,392. Generally, said polyester polyols are solid and require blending with a lower viscosity polyol before mixing with the various other components of the high temperature resistant cellular reaction mixture. Any of the above polyethers having viscosities, at 25°C., below about 20,000 centipoises can be used as diluents for the aforesaid halogenated polyester polyols provided that the overall hydroxyl functionality and equivalent weight of the resulting mixtures fall within the limits set forth above.

Illustrative of polyether polyols which can be used in the process of the invention are the polyoxyalkylene glycols such as diethylene glycol, dipropylene glycol, and the like, the alkoxylated aliphatic polyols such as glycerol, sorbitol, trimethylolpropane, pentaerythritol, 1,2,6-hexanetriol, and the like. Generally speaking, however, the preferred polyether polyols are the polyoxyalkylene glycols employed in an amount corresponding to from about 20 to about 50 percent by weight of the polyol mixture. The preferred polyester polyols are those comprising the product of reaction of chlorendic acid or the anhydride thereof and a polyhydric alcohol such as glycerol, trimethylolethane, trimethylolpropane and 1,2,6-hexanetriol.

Other optional additives such as dispersing agents, cell stabilizers, surfactants, flame retardants, and the like which are commonly employed in the fabrication of polymer foams, can be employed in the process of the invention. Thus a finer cell structure may be obtained if water-soluble organosilicone polymers are used as surfactants in the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene-ether glycol may be used, if desired, to obtain better dispersion of the components of the foam mixture.

Additives such as dyes, pigments, soaps and metallic powders and other inert fillers may be added to the foam mixture to obtain special foam properties in accordance with practices well known in the art.

The polymers of this invention possess outstanding high temperature and flame resistant properties. The cellular polymers of the invention have decomposition temperatures in excess of 500°C. as measured by thermal gravimetric analysis (TGA) and very low flame spread ratings as measured by ASTM E 84–61. It is to be noted that these high temperature resistant properties and low flame spread ratings have been achieved in the cellular polymers of the invention without recourse to the flame retardants which have hitherto been incorporated into cellular polymers to achieve flame retardant properties. The introduction of such flame retardants is highly undesirable because they tend to reduce the structural strength and like properties of the foam. Accordingly, the process and compositions of the invention represent a unique advance in foam technology. In particular the invention provides cellular polymers based on polyisocyanates which have sufficiently low flame spread ratings, as measured by the ASTM E 84–61 flame test, to permit the use of such polymers in the construction of domestic and industrial buildings.

The cellular products of the invention can be employed for all the purposes for which the currently produced commercial cellular products are conventionally employed. For example, the cellular products of the invention can be employed as thermal barriers in the construction of firewalls in the building of industrial and institutional structures (e.g., schools, hospitals, etc.) and as insulating materials for high-temperature pipelines and ovens, in supersonic aircraft and also as missile components. As previously pointed out, the novel process of the invention enables cellular products of the above type to be poured in place and thereby provides a very significant advantage over previous methods described for the preparation of polyimide and like foams. Thus the process of the invention does not require the application of external heat in order to effect the polymer formation nor does it require the heating of molds, cavity walls, and the like, to high temperatures.

The following examples describe the manner and process of making and using the invention and set forth the best mode contemplated by the inventor of carrying out the invention but are not to be construed as limiting. All parts are by weight unless otherwise stated. The various data relating to thermal stability was derived as follows.

Test A

The thermal gravimetric analysis (TGA) was carried out in air, by suspending a weighed (20–40 mg. sample from a Cahn RG Electrobalance (Cahn Instrument Company, 15505 Minnesota Avenue, Paramount, Calif.) in a small electrical wire coil furnace. The Cahn Electrobalance was connected to a Speed-O-Max W strip chart recorder (Leeds and Northrup Company, Philadelphia, Pa.). The furnace temperature was raised from room temperature (circa 25° C.) to approximately 1,000° C. in 7 minutes, and sample weight losses were automatically recorded on the strip chart.

Test B

Foam sample weight losses were obtained by exposing weighed samples to 320° C. for 10 minutes. The results are expressed in terms of the percentage, by weight, of sample observed to have been lost after the heat treatment.

The results in each test were expressed as the percentage, by weight, of the original sample which had been lost at each of a series of furnace temperatures.

EXAMPLE 1

A rigid foam was prepared in accordance with the invention using a foam metering and dispensing modulating unit equipped with a pin-type impeller rotating at 5,500 r.p.m. (Admiral Equipment Corporation, Akron, Ohio) to mix three components as follows:

Component A

A mixture prepared by blending 134 parts by weight (one equivalent) of polymethylene polyphenyl polyisocyanate of equivalent weight 133 (PAPI), 60 parts by weight (0.373 equivalent) of 3,3′,4,4′-benzophenone tetracarboxylic acid dianhydride and 0.6 parts by weight of a block copolymer of dimethyl polysiloxane polyethylene oxide surfactant (SF–1109). This mixture was maintained at 125° F. while being dispensed to the mixing head.

Component B

Epoxy novolac resin (Epon 152) of equivalent weight 172.

Component C

A mixture of 6 parts by weight (0.052 equivalent) of a blend of (i) 3 parts by weight of the material identified as Resin A in U.S. Pat. No. 3,214,392 (reaction product of one equivalent of 1,4,5,6,7,7-hexachlorobicyclo-(2·2·1)-5-heptene-2,3-dicarboxylic acid and two equivalents of trimethylolpropane and (ii) 1 part by weight of dipropylene glycol, 0.1 parts by weight of water, and 10 parts by weight of a solution of 3 parts by weight of triethylene diamine in 7 parts by weight of a mixture of o- and P-dimethylaminomethylphenol.

This Component C also was maintained at 125° F. while being dispensed to the mixing head.

The above three components were mixed in the mixing head in the ratio of 100 parts of Component A, 15.5 parts of Component B and 8.3 parts of Component C. The resulting mixture was dispensed at the rate of 19 pounds per minute into a series of cardboard molds (14″×14″×14″). The properties of the resultant foam, after curing for 48 hours at room temperature, were determined in accordance with the procedures set forth in the Manual of Physical Test Procedures of the Atlas Chemical Industries Inc., unless otherwise stated.

TABLE I

| Foam Properties | Foam 1 |
| --- | --- |
| Density | 2.17 p.c.f. |
| Compressive strength (parallel to rise) | 16.3 p.s.i. |
| Compressive strength after storage for 7 days at 200° F.: ambient R.H. | 17 p.s.i. |
| Compressive strength after storage at 450° F. for: 7 days | 19 p.s.i. |
| 14 days | 18 p.s.i. |
| ASTM E 84–61 Tunnel Test | |
| Flame spread rating | 25 |
| Smoke density rating | 0 |
| Bureau of mines flame penetration test | |
| Burn through time | 42 minutes |
| Thermal gravimetric analysis (Test A) | |
| % weight loss at: | |
| 350° C. | 1.1 |
| 400° C. | 1.7 |
| 450° C. | 5.5 |
| 500° C. | 10.4 |
| 550° C. | 17.4 |
| 600° C. | 23.0 |
| 650° C. | 30.5 |
| 700° C. | 60.0 |

EXAMPLE 2

Two foams were prepared by manual mixing of the ingredients set forth in Table II below, the ingredients being used in the proportions stated. In each case the polyisocyanate and the trimellitic anhydride were heated to 125° F. prior to mixing. The polyisocyanate, trimellitic anhydride and surfactant were blended with high-speed mechanical stirring, the hexahydrotriazine was added to the resulting mixture and the epoxide was added as the final ingredient. The resulting mixture was stirred at high speed for 15 seconds before being poured into a cardboard mold. The resulting foams were cured for 48 hours at room temperature before the properties set forth in the Table II were determined. Test procedures were identical to those reported in Table I.

TABLE II

| Components | Foam 2A | Foam 2B |
| --- | --- | --- |
| Polymethylene polyphenyl isocyanate (see Example 1) | 134 | 134 |
| Trimellitic anhydride | 60 | 90 |
| Organosilicone copolymer surfactant (DC–190) | 2 | 2 |
| N,N′,N″-tris(dimethylaminopropyl)-s-hexahydrotriazine | 6 | 4 |
| Epoxy novolac resin (Epon 152) | 10 | 10 |
| Foam Properties | | |
| Density, p.c.f. | 3.4 | 3.0 |
| Thermal gravimetric analysis (Test A) | | |
| % weight loss at: | | |
| 300° C. | 9.3 | 8.9 |
| 400° C. | 16.3 | 17.8 |
| 500° C. | 43.3 | 31.2 |
| 600° C. | 55.7 | 57.8 |
| 700° C. | 72.0 | 75.6 |

EXAMPLE 3

Using the manual mixing procedure described in Example 2, two foams were prepared using the ingredients and proportions set forth in Table III below. The resulting foams were cured at room temperature (25° C.) for 48 hours before being subjected to physical testing. All test procedures were those set forth in Table I above. The test data are set forth in Table III.

TABLE III

| Components | Foam 3A | Foam 3B |
| --- | --- | --- |
| Polymethylene polyphenyl isocyanate (see Example 1) | 67 | 67 |
| Benzophenone-3,3′,4,4′-tetracarboxylic dianhydride | 55 | 55 |
| Organosilicone copolymer surfactant (DC 200) | 0.1 | 0.1 |

| | | |
|---|---|---|
| N,N',N''-tris(dimethylaminopropyl)-s-hexahydrotriazine | 5 | 6 |
| Epoxy novolac resin (Epon 152) | 15 | 5 |
| Foam Properties | | |
| Density, p.c.f. | 2.9 | 3.2 |
| Thermal gravimetric analysis (Test A) | | |
| % weight loss at: | | |
| 200° C. | 2.1 | 2.4 |
| 300° C. | 4.2 | 6.1 |
| 400° C. | 10.4 | 12.2 |
| 500° C. | 18.8 | 20.4 |
| 600° C. | 31.2 | 47.0 |
| 700° C. | 58.3 | 63.3 |

EXAMPLE 4

Using the manual mixing procedure described in Example 2, two foams were prepared using the ingredients and proportions set forth in Table IV below. The polyisocyanate and anhydride were heated to 50° C. before mixing. The resulting foams were cured at room temperature (25° C.) for 48 hours. The rigid foams so produced were excellent in appearance, having uniform cell size and a light brown color.

TABLE IV

| Components | Foam 4A | Foam 4B |
|---|---|---|
| Polymethylene polyphenyl polyisocyanate (Example 1) | 134 | 134 |
| Benzophenone-3,3',4,4'-tetra-carboxylic dianhydride | 110 | 160 |
| Polyol blend of 3 parts by weight of Resin A (U.S. Pat. No. 3,214,392) and 1 part by weight of dipropylene glycol | 6 | 6 |
| Polyalkylene glycol diepoxide; eq. wt. = 190 (DER-736) | 20 | 30 |
| Mixture of o- and p-dimethyl aminomethylphenol (DMP-10) | 7 | 7 |
| Triethylene diamine | 3 | 3 |
| Surfactant: block copolymer of dimethylpolysiloxane polyethylene oxide (SF-1109) | 0.9 | 0.9 |
| Water | 0.1 | 0.1 |

EXAMPLE 5

Using the manual mixing procedure described in Example 2, a foam was prepared using the ingredients and proportions set forth in Table V below. The polyisocyanate and anhydride were heated to 50° C. before mixing. The resulting foam was cured at room temperature (25° C.) for 48 hours. The rigid foam so obtained was light brown in color and had uniform cells of small size.

TABLE V

| Components | Foam 5 |
|---|---|
| Polymethylene polyphenyl isocyanate | 134 |
| Benzophenone-3,3',4,4'-tetracarboxylic dianhydride | 45 |
| Mixture of o- and p-dimethylaminoethyl-phenol | 9 |
| Triethylene diamine | 2 |
| Organosilicon surfactant (DC-193) | 1 |
| Epoxy resin: Bisphenol A-epichlorohydrin condensate equivalent weight = 178 (DER 332) | 20.3 |

I claim:

1. In a process for the preparation of a high temperature resistant polymer foam characterized by the presence of isocyanurate moieties and moieties selected from the class consisting of amide and imide moieties, by reaction of an organic polyisocyanate and a polycarboxylic derivative containing at least two carboxylic moieties selected from the class consisting of free carboxylic acid groups and anhydride groups, the improvement which comprises carrying out the reaction by separately preheating the polyisocyanate and polycarboxylic acid derivative to a temperature of about 35° C. to about 100° C. and bringing said preheated components together, in a proportion corresponding to about 0.6 to about two equivalents of polyisocyanate per equivalent of polycarboxylic derivative, in the presence of from about 0.01 mole to about 0.2 mole, per mole of polyisocyanate, of a homocyclic polyepoxide and from about 0.01 mole to about 0.2 mole, per mole of isocyanate, of a tertiary amine, and thereafter supplying no external heat to the reaction mixture.

2. A process according to claim 1 wherein the polyisocyanate is a polymethylene polyphenyl polyisocyanate containing from about 35 to about 85 percent by weight of methylenebis(phenyl isocyanate).

3. A process according to claim 1 wherein the polycarboxylic derivative is selected from the class consisting of anhydrides having the following formulas:

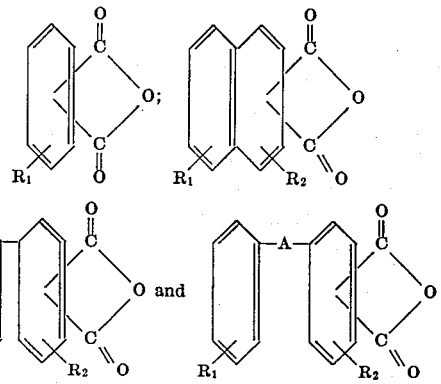

wherein at least one of $R_1$ and $R_2$ represents a group selected from the class consisting of carboxyl and the group

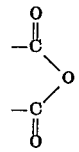

wherein the carbon atoms of the latter are each attached to adjacent carbon atoms in an aromatic ring, and wherein $R_1$ and $R_2$ additionally may represent from zero to three substituents selected from the group consisting of halogen and lower-alkyl and A is a bridging group selected from the class consisting of lower-alkylene, carbonyl, sulfonyl and oxygen.

4. A process according to claim 1 wherein the homocyclic polyepoxide is selected from the class consisting of the glycidyl ethers of a polyhydric mononuclear phenol, a polyhydric fused ring phenol, and a nonfused polynuclear polyhydric phenol having the formula:

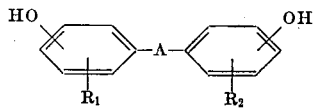

wherein $R_1$ represents from zero to four substituents selected from the class consisting of halogen and lower-alkyl, A is a bridging group selected from the class consisting of

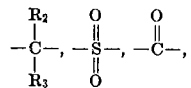

, —O—, and a single covalent bond, wherein $R_2$ and $R_3$ each represent a moiety selected from the class consisting of hydrogen, lower-alkyl, lower-cycloalkyl and aryl.

5. A process according to claim 1 wherein the tertiary amine employed as catalyst is selected from the class consisting of triethylene diamine, N,N',N''-trialkylaminoalkylhexahydrotriazine, a mono(dialkylaminoalkyl)phenol, a 2,4,6-tri(dialkylaminoalkyl)phenol and mixtures thereof.

6. A process according to claim 1 wherein a minor amount of an organic polyol is present in the reaction mixture.

7. A process for the preparation of a high temperature resistant polymer foam characterized by the presence of isocyanurate moieties and moieties selected from the class consisting of amide and imide moieties, which comprises reacting a polymethylene polyphenyl polyisocyanate and a polycarboxylic acid derivative in a molar proportion of about 0.6:1.0 to about 2:1 in a one-shot reaction in the presence of a mixture of from about 0.01 mole to about 0.2 mole, per mole of polyisocyanate, of a homocyclic polyepoxide and from about 0.01 mole to about 0.2 mole, per mole of polyisocyanate, of a tertiary amine, said polymethylene polyphenyl polyisocyanate and said polycarboxylic acid derivative having each been heated to a temperature within the range of about 35° C. to about 100° C. prior to being mixed, no external heat being supplied to the reaction mixture after the reactants are brought together.

8. A process according to claim 7 wherein the polycarboxylic derivative is selected from the class consisting of anhydrides having the following formulas:

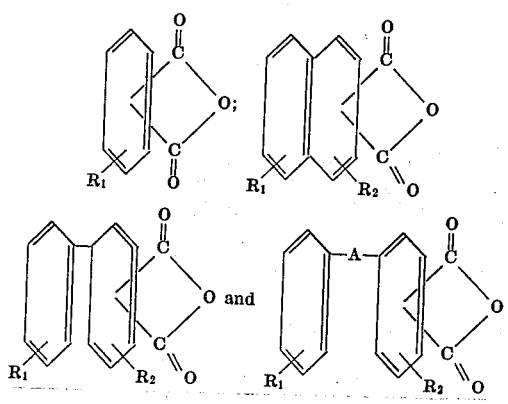

wherein at least one of $R_1$ and $R_2$ represents a group selected from the class consisting of carboxyl and the group

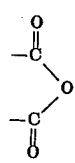

wherein the carbon atoms of the latter are each attached to adjacent carbon atoms in an aromatic ring, and wherein $R_1$ and $R_2$ additionally represent from zero to three substituents selected from the group consisting of halogen and lower-alkyl and A is a bridging group selected from the class consisting of lower-alkylene, carbonyl, sulfonyl and oxygen.

9. A process according to claim 7 wherein the homocyclic polyepoxide is selected from the class consisting of the glycidyl ethers of a polyhydric mononuclear phenol, a polyhydric fused ring phenol, and a nonfused polynuclear polyhydric phenol having the formula:

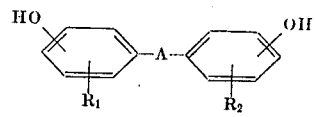

wherein $R_1$ represents from zero to four substituents selected from the class consisting of halogen and lower-alkyl, A is a bridging group selected from the class consisting of

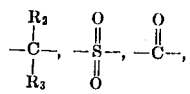

, —O—, and a single covalent bond, wherein $R_2$ and $R_3$ each represent a moiety selected from the class consisting of hydrogen, lower-alkyl, lower-cycloalkyl and aryl.

10. A process according to claim 7 wherein the tertiary amine employed as catalyst is selected from the class consisting of triethylene diamine, an N,N',N''-trialkylaminoalkylhexahydrotriazine, a mono(dialkylaminoalkyl)phenol, a 2,4,6-tri(dialkylaminoalkyl)phenol and mixtures thereof.

11. A process according to claim 1 wherein a minor amount of an organic polyol is present in the reaction mixture.

12. A process for the preparation of a high temperature resistant rigid polymer foam characterized by the presence of isocyanurate moieties and moieties selected from the class consisting of amide and imide moieties, which comprises reacting a polymethylene polyphenyl polyisocyanate and benzophenone-3,3',4,4'-tetracarboxylic dianhydride in the molar proportion of 0.6:1.0 to 2:1 in a one-shot reaction in the presence of a mixture of from about 0.01 mole to about 0.2 mole, per mole of polyisocyanate, of a homocyclic polyepoxide and from about 0.01 mole to about 0.2 mole, per mole of polyisocyanate, of a tertiary amine, said polyisocyanate and said dianhydride having each been heated to a temperature of approximately 50° C. prior to being admixed, and no external heat being supplied to the reaction mixture after the reactants are brought together.

13. A process for the preparation of a high temperature resistant rigid polymer foam characterized by the presence of isocyanurate moieties and moieties selected from the class consisting of amide and imide moieties, which comprises reacting a polymethylene polyphenyl polyisocyanate and trimellitic anhydride in the molar proportion of 0.6:1 to 2:1 in a one-shot reaction in the presence of a mixture of from about 0.01 mole to about 0.2 mole, per mole of polyisocyanate, of a homocyclic polyepoxide and from about 0.01 mole to about 0.2 mole, per mole of polyisocyanate, of a tertiary amine, said polyisocyanate and said anhydride having each been heated to a temperature of approximately 50° C. prior to being admixed, and no external heat being supplied to the reaction mixture after the reactants are brought together.

* * * * *